UNITED STATES PATENT OFFICE.

LYMAN DEE PETTIT, OF EVERETT, WASHINGTON.

LUBRICANT.

1,143,724.  Specification of Letters Patent.  Patented June 22, 1915.

No Drawing.  Application filed June 12, 1913.  Serial No. 773,299.

*To all whom it may concern:*

Be it known that I, LYMAN DEE PETTIT, citizen of the United States of America, residing at Everett, in the county of Snohomish and State of Washington, have invented certain new and useful Improvements in Lubricants, of which the following is a specification.

This invention relates to certain new and useful improvements in lubricating compounds particularly adapted for use to alleviate the possibility of hot-boxes on steam engines and the like and also to diminish to the minimum friction of the working parts of machinery.

The compound is composed of the following ingredients, in the proportions stated: crude petroleum oil, 41 parts; lime water, 41 parts; a preparation of rosin, 13 parts; graphite, $2\frac{3}{4}$ parts; paraffin wax, $\frac{1}{4}$ of 1 part; kerosene, 1 part, red engine oil, 1 part. A mixture formed of these ingredients in the proportions stated results in a highly efficient lubricant and one which has been proven not to be affected by a wide range in temperature, and is, therefore, a desirable cooling medium for hot-boxes on steam engines and the like.

In making the compound, an amount of crude petroleum oil (for instance 22 gallons) is mixed with a like amount of lime water until they are thoroughly incorporated and resemble thick cream. An amount of the preparation of rosin equal to one-seventh of the entire amount (or $6\frac{1}{3}$ gallons) is then added to the mass, together with from 8 to 20 pounds of graphite and two pounds of paraffin wax mixed with one quart of red engine oil. The lime water, preferably used in my admixture, is prepared as follows:—To 40 pounds of air slaked lime (hydrated preferred) add 25 gallons of soft rain water which, after standing several hours, should be thoroughly mixed and strained through a fine wire screen or gunny cloth to remove all sediment and grit therefrom. The preparation of rosin is formed by adding to 22 pounds of dark colored rosin $2\frac{1}{2}$ gallons of kerosene which is heated until the mass is melted, when $1\frac{1}{2}$ gallons of red engine oil is mixed therewith. After cooling, it is ready for use. The paraffin wax is cut into small particles and enough red engine oil added to cover it. It is then heated and after melting, one-eighth of a teaspoonful of soda is added. The mass should be stirred until cool. The graphite should likewise be mixed with red engine oil. Red engine oil is the best petroleum oil, being the first oil drawn off at the refinery. After the gasolene, kerosene and paraffin are drawn off the petroleum is put into a refinery tank and the red engine oil is taken from the top after setting. Such ingredients, when mixed together, will make 400 pounds of lubricant, though it is of course understood any desired amount may be prepared, using the proportions set forth. By omitting certain of these ingredients and combining the balance in different proportions, I am enabled to make an efficient form of cylinder oil particularly useful as a lubricant about the different parts of machinery. My cylinder oil consists of the following:—crude petroleum oil, 24 parts; lime water, 48 parts; a preparation of rosin 4 parts; red engine oil, 24 parts. These formulæ result in a lubricant which will not decompose or distil and dry up when subjected to an immediate heat, as in a steam cylinder, or whether it is slow and long continued, as in slides and other bearings, and is therefore superior to lubricants now on the market which are so affected.

What I claim as my invention is—

1. The herein described lubricating compound consisting of liquid petroleum 42 parts, paraffin wax 25 parts, graphite $2\frac{3}{4}$ parts, lime water 41 parts and a mixture of rosin and refined petroleum 14 parts.

2. The herein described lubricating compound consisting of crude petroleum 41 parts, lime water 41 parts, graphite $2\frac{3}{4}$ parts, paraffin wax 25 parts, red engine oil 1 part and a mixture of rosin and refined petroleum 14 parts.

3. The herein described lubricating compound consisting of crude petroleum oil 41 parts, lime water 41 parts, graphite 2¾ parts, paraffin wax 25 parts, red engine oil 1 part and a mixture of 13 parts rosin and 1 part refined petroleum oil.

4. The herein described lubricating compound consisting of crude petroleum oil 41 parts, lime water 41 parts, graphite 2¾ parts, paraffin wax 25 parts, red engine oil 1 part and a mixture of 13 parts rosin and 1 part kerosene.

In testimony whereof I affix my signature in presence of two witnesses.

LYMAN DEE PETTIT.

Witnesses:
EARL W. HUSTED,
BENJ. W. SHERWOOD.